US006701997B2

(12) United States Patent
Gellert et al.

(10) Patent No.: US 6,701,997 B2
(45) Date of Patent: *Mar. 9, 2004

(54) INJECTION MOLDING COMPONENT WITH HEATING ELEMENT AND METHOD OF MAKING

(76) Inventors: Jobst U. Gellert, 7A Prince Street, Glen Williams, ON (CA), L7G 2X1; Hakim Belhadjamida, 506 Donalds Avenue, Toronto, ON (CA), M4J 3S4

( * ) Notice: Subject to any disclaimer, the term of this patent is extended or adjusted under 35 U.S.C. 154(b) by 24 days.

This patent is subject to a terminal disclaimer.

(21) Appl. No.: 10/171,615

(22) Filed: Jun. 17, 2002

(65) Prior Publication Data

US 2002/0148590 A1 Oct. 17, 2002

Related U.S. Application Data

(62) Division of application No. 09/493,149, filed on Jan. 28, 2000, now Pat. No. 6,405,785.

(51) Int. Cl.[7] .................. B22D 17/04; B22D 19/14; B22D 19/00; B22D 37/00
(52) U.S. Cl. .................. 164/312; 164/95; 164/98; 164/337
(58) Field of Search ................. 164/98; 425/549; 228/161

(56) References Cited

U.S. PATENT DOCUMENTS

| 4,203,197 A | 5/1980 | Crandell |
| 4,268,241 A | 5/1981 | Rees et al. |
| 4,312,630 A | 1/1982 | Travaglini |
| 4,314,399 A | 2/1982 | Severinsson |
| 4,355,460 A | 10/1982 | Gellert |
| 4,431,449 A | 2/1984 | Dillon et al. |
| 4,439,915 A | 4/1984 | Gellert |
| 4,455,353 A | 6/1984 | Bruce |
| 4,455,354 A | 6/1984 | Dillon et al. |
| 4,500,279 A | 2/1985 | Devellian |
| 4,554,218 A | 11/1985 | Gardner et al. |
| 4,557,685 A | 12/1985 | Gellert |
| 4,648,546 A | 3/1987 | Gellert |
| 4,688,622 A | 8/1987 | Gellert |
| 4,710,223 A | 12/1987 | Matejcezyk |
| 5,096,411 A | 3/1992 | Gellert |
| 5,360,333 A | 11/1994 | Schmidt |
| 5,405,258 A | 4/1995 | Babin |
| 5,411,392 A | 5/1995 | Von Buren |
| 5,437,093 A | 8/1995 | Gellert |
| 5,458,480 A | 10/1995 | Newkirk et al. |
| 5,507,336 A | 4/1996 | Tobin |
| 5,574,959 A | 11/1996 | Tsujioka et al. |
| 5,652,003 A | 7/1997 | Gellert |
| 5,730,915 A | 3/1998 | Cornie |
| 5,775,402 A | 7/1998 | Sachs et al. |
| 5,824,166 A | 10/1998 | McDonald |
| 5,832,981 A | 11/1998 | McDonald et al. |
| 5,973,296 A | 10/1999 | Juliano et al. |
| 6,460,598 B1 * | 10/2002 | Adams et al. .................. 164/98 |

FOREIGN PATENT DOCUMENTS

| EP | 0 681 899 A | 11/1995 |
| EP | 0 963 829 A1 | 12/1999 |

* cited by examiner

*Primary Examiner*—M. Alexandra Elve
*Assistant Examiner*—Kevin McHenry
(74) *Attorney, Agent, or Firm*—Bereskin & Parr

(57) ABSTRACT

The present invention provides improved heated manifolds, heaters and nozzles for injection molding, having a high strength metal skeleton infiltrated with a second phase metal having higher thermal conductivity. Also disclosed is method of forming a manifold, heater or nozzle preform and infiltrating the preform with a highly thermally conductive material. The invention also provides a method of simultaneously infiltrating and brazing injection molding components of similar or dissimilar materials together.

3 Claims, 13 Drawing Sheets

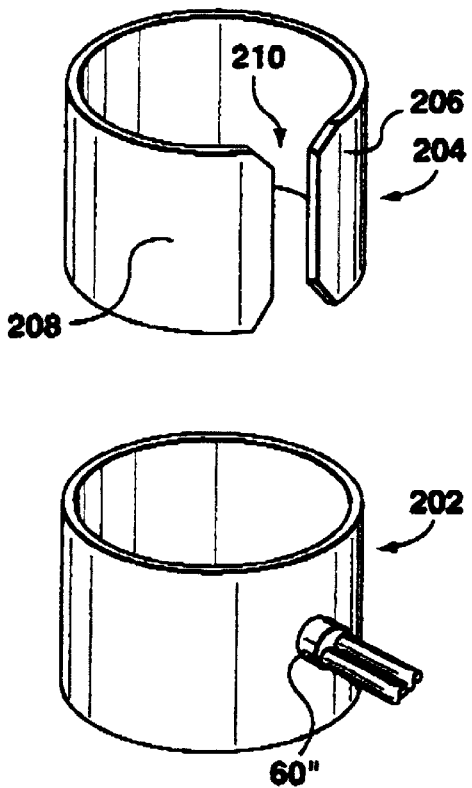
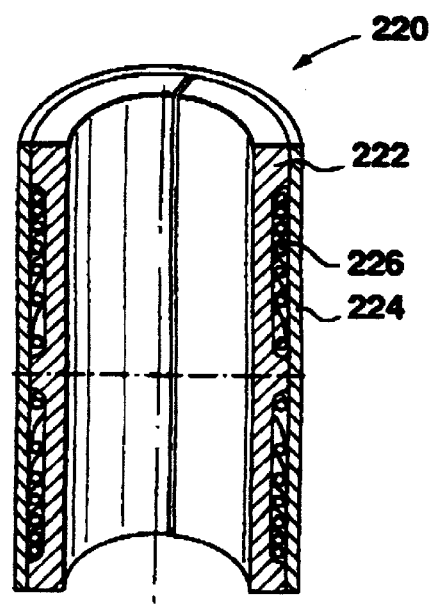
FIG. 13
FIG. 14

INJECTION MOLDING COMPONENT WITH HEATING ELEMENT AND METHOD OF MAKING

This application is a division of application Ser. No. 09/493,149 filed Jan. 28, 2000, which is now U.S. Pat. No. 6,405,785.

FIELD OF THE INVENTION

The invention relates to injection molding and more particularly to an improved heating element, having high strength and high thermal conductivity, for use in an injection molding apparatus.

BACKGROUND OF THE INVENTION

As is well known in the art, hot runner injection molding systems have a manifold to convey the pressurized melt from the inlet at a molding machine to one or more outlets, each of which lead to a nozzle which, in turn, extends to a gate to an injection mold cavity. Manifolds and nozzles have various configurations, depending upon the number and arrangement of the cavities. It is known to be desirable to provide a means of heating the manifold and/or nozzles to maintain a desired temperature distribution across the manifold and/or nozzle; Various means of heating manifolds and nozzles are known. For instance, a manifold can have an electrical heating element integrally cast or brazed into the manifold, as described respectively in U.S. Pat. Nos. 4,688,622 to Gellert and 4,648,546 to Gellert, a cartridge heater can be cast in the manifold, as disclosed in U.S. Pat. No. 4,439,915 to Gellert, or a plate heater can be positioned adjacent the manifold to provide heat thereto, as disclosed in pending U.S. patent application Ser. No. 09/327,490, filed Jun. 8, 1999 and concurrently owned herewith. Similarly, a nozzle may have an integral heater element brazed therein, as shown in U.S. Pat. No. 4,557,685 to Gellert, may have a heated sleeve disposed around the nozzle, as shown in U.S. Pat. Nos. 5,411,392 and 5,360,333 to Von Buren and Schmidt, respectively, or may employ a film heater as shown in U.S. Pat. No. 5,973,296.

The high pressures and temperatures and numerous cycles experienced in injection molding systems requires manifold, nozzle and heater components to be fabricated of high strength materials, typically high strength tools steels, such as H13. Such materials also typically have good corrosion resistance properties, which is beneficial as is well known in the art. Tools steels, however, have poor thermal conductivity, making exacting control over runner and gate temperatures difficult. Materials such as copper, however, though highly thermally conductive, typically have low strength and hardness in comparison to tool steels. Further, copper and its alloys also have a very poor corrosion resistance. Though, other thermally conductive materials are known, such as refractory alloys like molybdenum and tungsten, these materials can be prohibitively expensive, not to mention difficult to machine For some applications, it is known that high strength and high thermal conductivity can be achieved through the use of so-called metal infiltration techniques, wherein a porous skeleton composed of a high strength metal is infiltrated by a thermally conductive metal to yield a two-phase composite part having improved characteristics over both component metals. U.S. Pat. No. 4,710,223 to Matejcezyk discloses an infiltration method for achieving super erosion and high-temperature resistance in rocket nozzles and reaction engines by infiltrating a refractory metal, such as molybdenum or tungsten, with copper or an alloy of copper.

U.S. Pat. No. 5,775,402 to Sachs discloses a process of so-called 'three dimensional printing' whereby a metal powder/binder mixture is deposited in layers by computer-controlled machinery to fabricate the complexly-shaped preform layer-by-layer. The preform is then sintered and infiltrated according to known techniques to achieve a two-phase material having good strength and temperature conductivity. Sachs however, requires complex programming and machinery to achieve the preform.

There is a need for achieving injection molding manifold, nozzle and heater components with increased thermal conductivity without sacrificing strength and, further, there is a need for achieving such parts through simpler fabrication techniques.

As noted above, injection molding components can be heated by an integral heater, such as disclosed in U.S. Pat. No. 4,648,546 to Gellert. Typically, a brazing or bonding step is required to join the heater element to the component, to obtain good heat transfer characteristics between the element and the manifold, nozzle and/or heater. This brazing step, however, requires additional effort and time in the tooling process Accordingly, there is also a need for a reduction in the number of manufacturing and tooling operations required in making high strength and highly thermally conductive manifolds, nozzles and heaters.

SUMMARY OF THE INVENTION

In a first embodiment, the present invention provides an assembly for heating an injection molding component, the assembly comprising a body and a heating element for controllably heating the body, the heating element attached to the body, wherein the body is made of a parent metal, the parent metal being at least partially infiltrated with a second metal, the second metal having a higher thermal conductivity than the parent metal.

In a second embodiment, the present invention provides a hot runner injection molding apparatus comprising a melt conveying system, the system having a melt distribution manifold having at least one melt passage for transferring melt from a source of pressurized melt, and at least one injection nozzle having a melt bore therethrough, the melt bore in fluid communication with the at least one manifold melt passage, at least one mold cavity adjacent the at least one nozzle, the mold cavity in fluid communication with the melt bore of the at least one nozzle, a body for heating at least a portion of the melt conveying system, the body having a heating element attached thereto, the heating element capable of heating at least a portion of the body, wherein at least a portion of the body is made of a parent metal, the parent metal being at least partially infiltrated with a second metal having a higher thermal conductivity than the parent metal In a third embodiment, the present invention provides a process for fabricating an injection molding component having an electrical heating attached thereto, the process comprising the steps of: contacting the electrical heating element with a powdered metal preform having at least partial open porosity, the powdered metal preform being composed of a first metal; contacting the preform adjacent a region of the open porosity with a mass of a second metal, the second metal having higher thermal conductivity than the first metal; heating the preform, the heating element and the mass so as to cause the second metal to at least partially infiltrate the open porosity of the preform and at least partially join the heating element to the preform when cooled.

In a fourth embodiment, the present invention provides a process for fabricating a metal part having at least two components, the process comprising the steps of: making a powdered preform of a first component, the preform having at least partial open porosity; contacting a second component with the preform of the first component; and infiltrating the open porosity of preform with a second metal wherein the second component is brazed to the first component by the second metal substantially contemporaneously with the infiltration step.

In a fifth embodiment, the present invention provides a process for fabricating a metal part having at least two components, the process comprising the steps of: making a powdered preform of a first component, the preform having at least partial open porosity; contacting a second component with the preform of the first component to form an assembly thereof; contacting the preform first component with a mass of a metal infiltrant; controllably heating the assembly and the metal infiltrant to melt the metal infiltrant; holding the assembly and the metal infiltrant at temperature until the open porosity of the preform of the first component is at least partially infiltrated by the metal infiltrant and the second component is at least partially brazed to the first component by the metal infiltrant; and controllably cooling the assembly to solidify the metal infiltrant.

In a sixth embodiment, the present invention provides a process for fabricating an injection molding component, the process comprising the steps of: mixing a powdered tool steel with a binder to form an admixture; injecting the admixture into a preform; debinderizing the preform; partially sintering the preform to achieve 40% to 10% volume open porosity therein; contacting the preform with a metal infiltrant, the metal infiltrant having high thermal conductivity; controllably heating the preform and the metal infiltrant to at least the melting temperature of the metal infiltrant; holding the preform and the metal infiltrant at temperature until the porosity of the first component is at least partially infiltrated by the metal infiltrant, and cooling the preform to solidify the metal infiltrant and yield the injection molding component

BRIEF DESCRIPTION OF THE DRAWINGS

For a better understanding of the present invention, and to show more clearly how it may be carried into effect, reference will now be made by way of example to the accompanying drawings. The drawings show articles made according to preferred embodiments of the present invention, in which:

FIG. 13 is an exploded view of a band heater and spring clamp according to one aspect of the embodiment of FIG. 12;

FIG. 14 is a sectional side view of a bimetallic band heater according to a second aspect of the embodiment of FIG. 12;

DETAILED DESCRIPTION OF THE PREFERRED EMBODIMENTS

Figure 1:
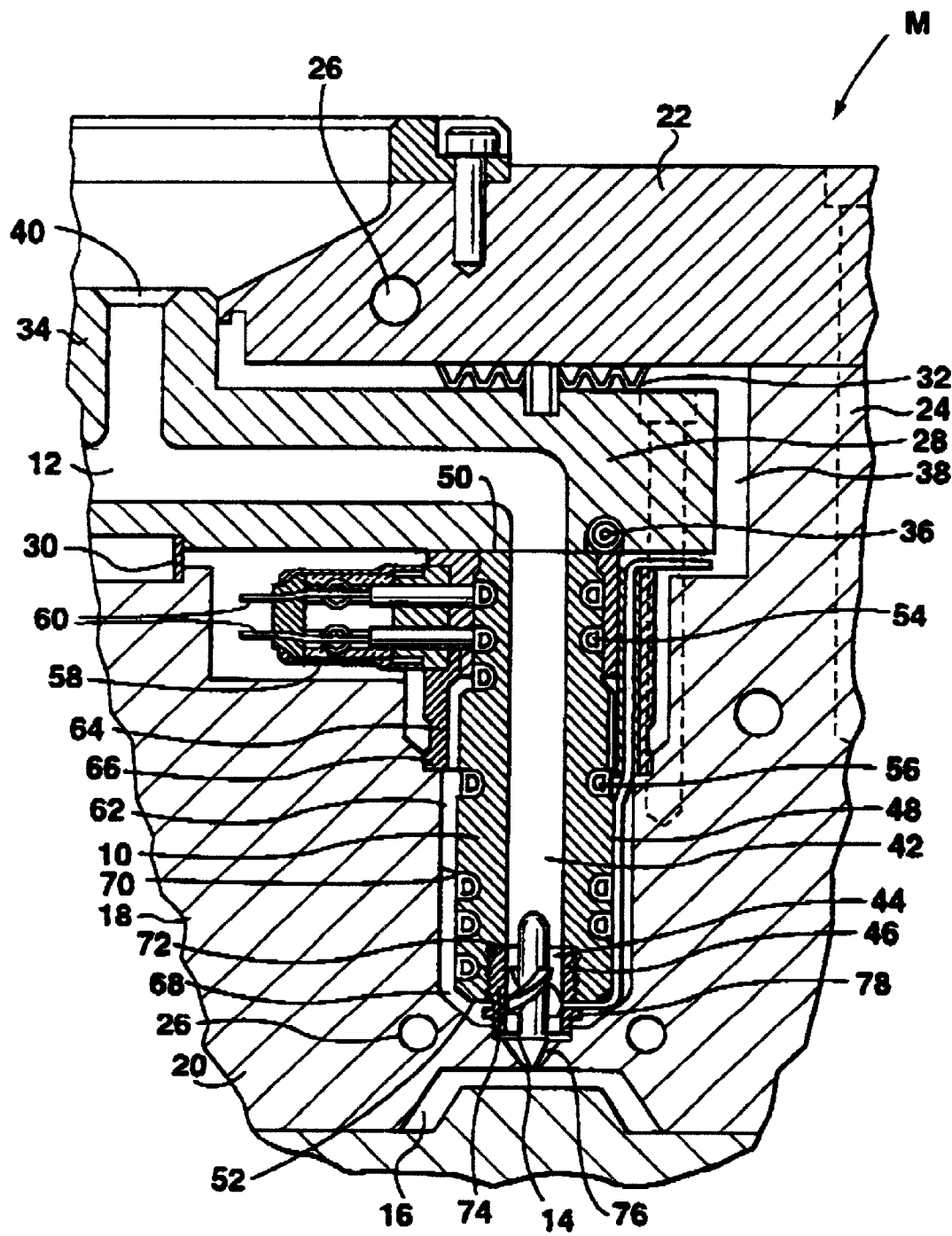
FIG. 1 is a sectional side view of a portion of a typical injection molding system incorporating an infiltrated heated manifold in accordance with the present invention.

An injection molding system according to the present invention is shown in the Figures generally at M. Reference is first made to FIG. 1, which shows a portion of molding system M having one or more steel nozzles 10 (only one is shown in FIG. 1) to convey pressurized plastic melt through a melt passage 12 to a gate 14 leading to a cavity 16 in a mold 18. In this particular configuration, mold 18 includes a cavity plate 20 and a back plate 22 which are removably secured together by bolts 24. It will be understood that mold 18 may have a greater number of plates depending on the application, only plates 20, 22 are shown and described here, for ease of illustration.

Mold 18 is cooled by pumping cooling water through cooling conduits 26 extending in cavity plate 20 and back plate 22. An electrically heated, infiltrated melt distribution manifold 28 (preferably copper-infiltrated steel) is mounted between cavity plate 20 and back plate 22 by a central locating ring 30, positioned in a mating hole 30a manifold 28, and insulative and resilient spacer members 32 Melt distribution manifold 28 has a cylindrical inlet portion 34 and is heated by an integral electrical heating element 36. An insulative air space 38 is provided between heated manifold 28 and the surrounding cooled cavity plate 20 and back plate 22. Melt passage 12 extends from a common inlet 40 in inlet portion 34 of manifold 28 and branches outward in manifold 28 to each nozzle 10 where it extends through a central melt bore 42 and then through an aligned central opening 44 in a torpedo 46 to one of gates 14.

Each nozzle 10 has an outer surface 48, a rear end 50, and a forward end 52. Nozzle 10 of this particular configuration is also heated by an integral electrical heating element 54 which has a spiral portion 56 extending around melt bore 42 and an external terminal 58 to which electrical leads 60 from a power source are connected. In other applications, heating element 36 and the melt itself may supply sufficient heat that a heating element is not required in nozzle 10. Nozzle 10 is seated in a well 62 in cavity plate 20 with a cylindrical locating flange 64 extending forwardly to a circular locating shoulder 66 in well 62. Thus, an insulative air space 68 is provided between inner surface 70 of well 62 and outer surface 48 of nozzle 10 to provide thermal separation between heated nozzle 10 and the surrounding cooled mold cavity 16. In this embodiment, melt bore 42 has an enlarged portion with a threaded inner surface 72 to form a threaded seat 74 at its forward end 52. In this particular configuration, well 62 has a smaller central portion 76 which extends forwardly past air space 68 and tapers inwardly to gate 14. A small circular seat 78 extends in mold cavity 16 around a central portion 76 of well 62 It will be understood that nozzle 10 may have other configurations for different gating arrangements, depending on the gating desired for a particular application.

Figure 2:
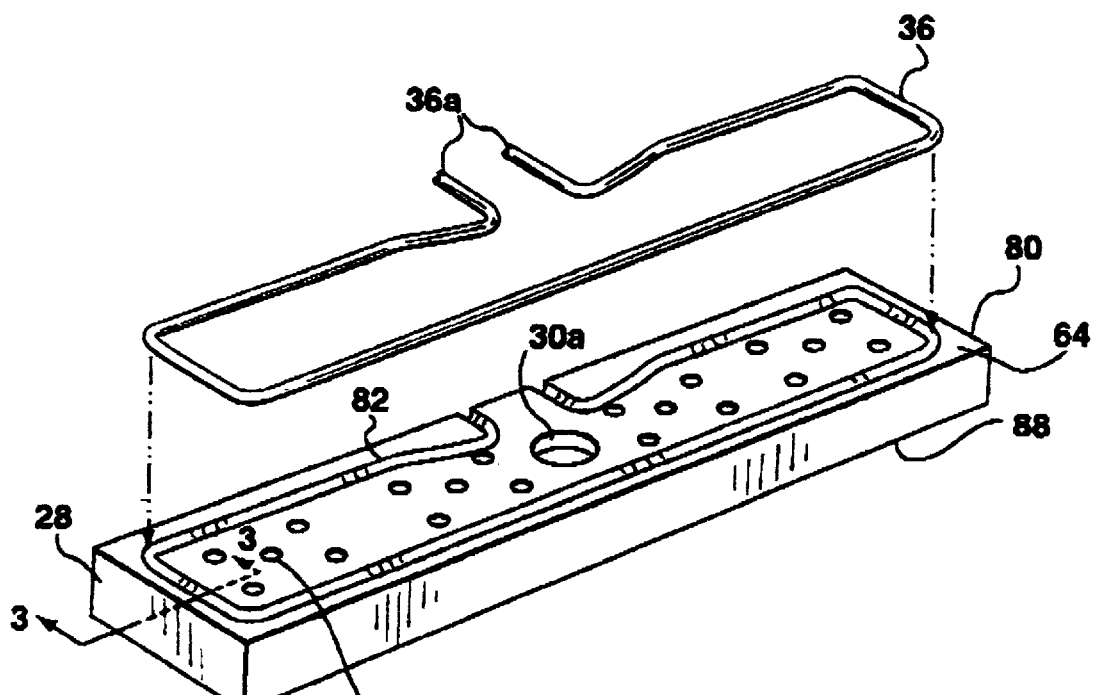
FIG. 2 is an exploded isometric view, from the underside, of the heated manifold assembly of FIG. 1.
Figure 3:
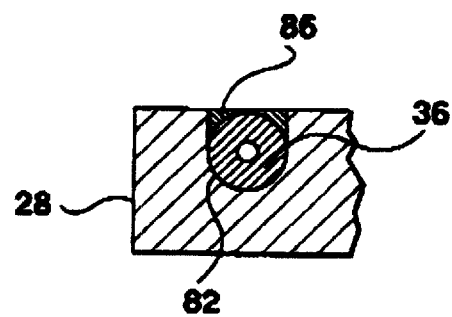
FIG. 3 is a sectional view along the line 3—3 in FIG. 2.

Referring to FIGS. 2 and 3, manifold 28 comprises a substantially planar body 80 having a groove 82 in a face 84 of body 80 for receiving electrical heater element 36. The configuration of groove 82 in face 84 is designed to provide manifold 28 with a desired temperature distribution depending on the application. Element 36 is brazed (indicated by reference numeral 86) into groove 82 in face 84. Such brazing may be performed according to U.S. Pat. No. 4,648,546 to Gellert, incorporated herein by reference, or by other known brazing techniques, i.e. as separate and distinct operations after the infiltration of manifold 28 has been completed, however, according to an aspect of the present invention such brazing is preferably achieved simultaneously with the infiltration of manifold 28, as will be described more fully below. Also, rather than brazing, element 36 may equally be joined to manifold 28 by other means, such as other mechanical attachment means, as are known in the art, such as by pressing element 36 into manifold 28 to create an interference, friction or deformation fit. Likewise, thermal spraying techniques may be employed to bond element 36 to manifold 28. The placement of heating element 36 can also be varied to locate it in an opposite face 88 of body 80, rather than face 84.

Figure 4:
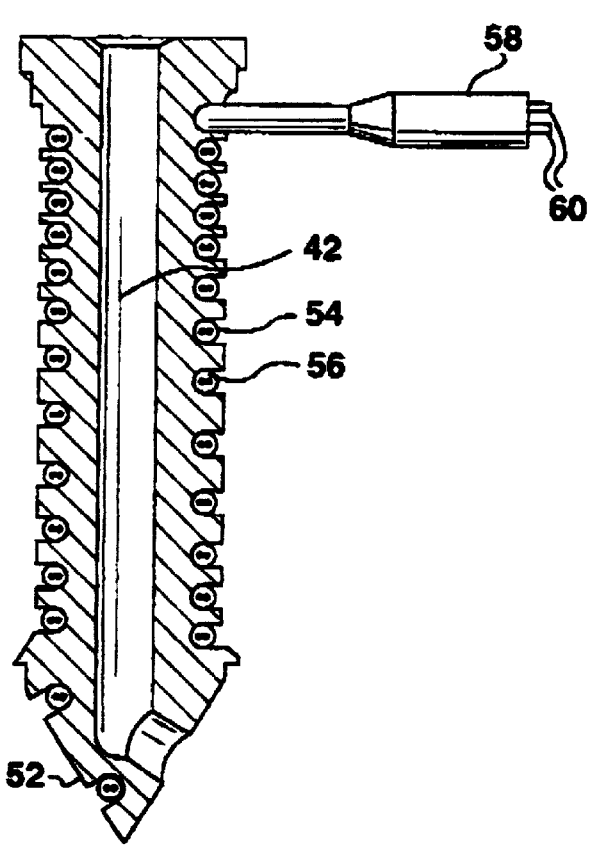
FIG. 4 is a sectional side view of the heated nozzle of FIG. 1.
Figure 5:
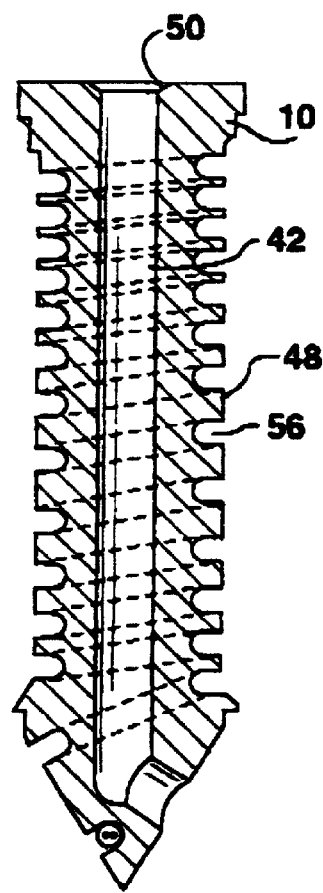
FIG. 5 is a sectional side view of the nozzle of FIG. 4, shown prior to installation of the nozzle heating element.

Referring to FIGS. 4 and 5, outer surface 48 of nozzle 10 has a generally spiralled channel 56 which extends around and along surface 48 of nozzle 10. A generally helical heating element 54 is received in the channel 56 and is embedded therein by brazing with a highly conductive material, such as nickel or copper, as is more fully described in U.S. Pat. No. 4,557,685 to Gellert and incorporated herein by reference. As described in the '685 patent, and as may be seen in the Figures, the pitch of the spiralled channel 56 is not necessarily uniform, and is generally tighter in the vicinity of the areas where more heat is required.

Figure 6:
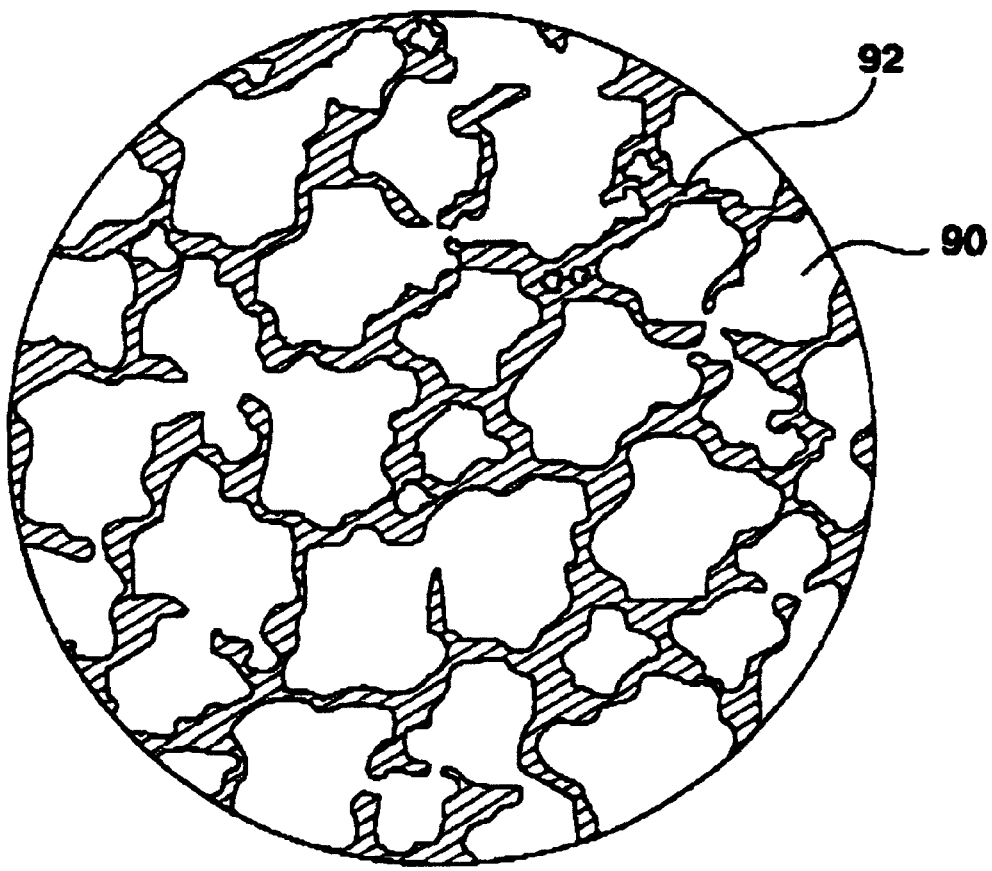
FIG. 6 is a representation of a photomicrograph of the infiltrated heated manifold of the device of FIG. 1.

Referring to FIG. 6, manifold 28 comprises a metal skeleton 90 infiltrated by a second phase metal 92, the second phase metal 92 having a higher thermal conductivity than that of metal skeleton 90. Metal skeleton 90 is preferably a tool steel, and more preferably one of H13, M2 and D2, and most preferably H13. Second phase metal 92 is any highly thermally conductive metal and preferably copper, a copper alloy, silver or silver alloy, most preferably copper. In this application, including the claims appended hereto, it will be understood that the term "metal" is used to refer generally to both pure metals and alloys of metal(s). The process by which infiltration is achieved is described in more detail below.

In a second embodiment, nozzle(s) 10 in molding system M is also infiltrated by a second phase metal, in a manner as just described for manifold 28, and heater element 54 is also simultaneously brazed during infiltration into groove 56 by the second phase metal, as described below. In another aspect of this embodiment, nozzle 10 is infiltrated and manifold 28 is not.

Figure 7:
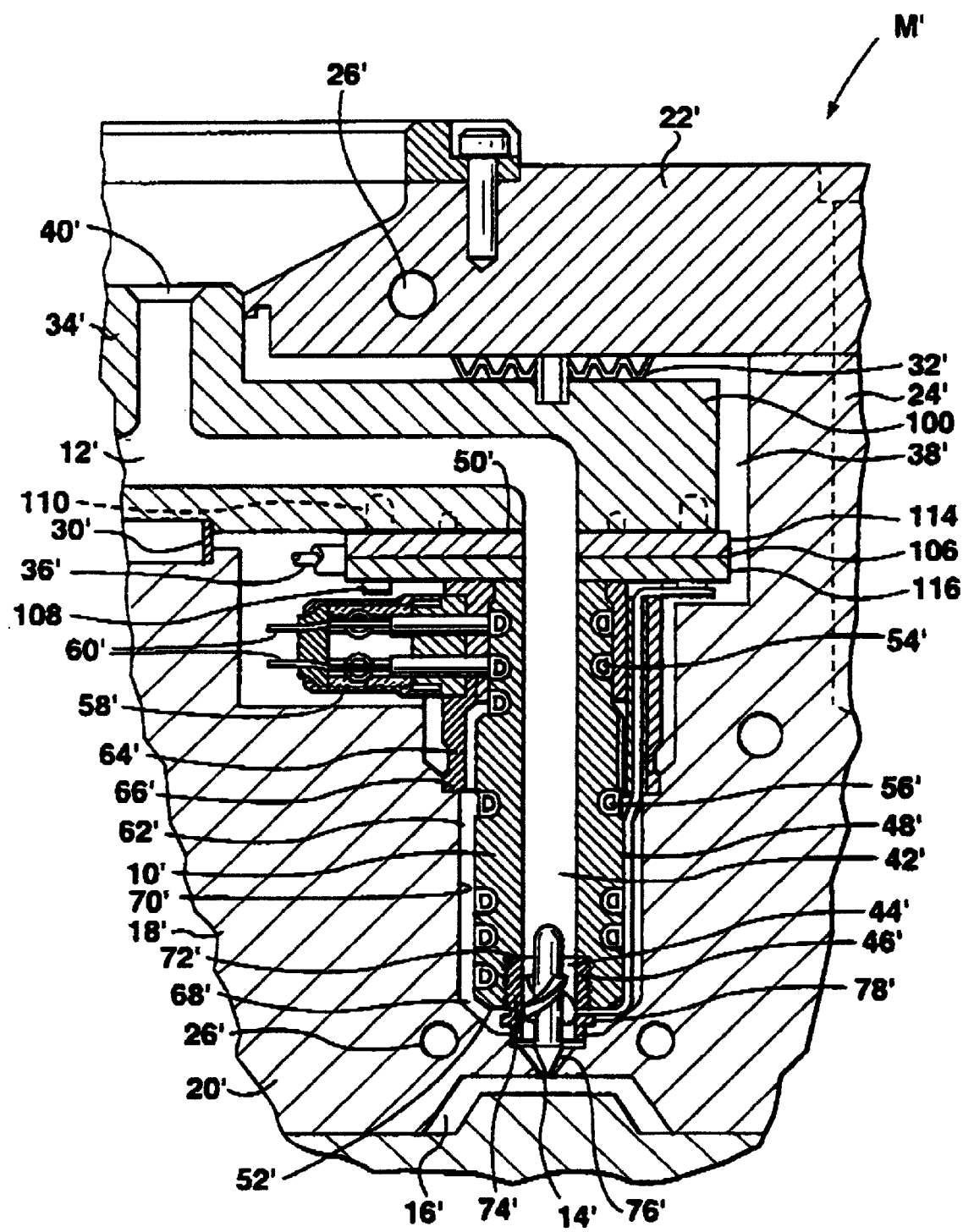
FIG. 7 is a sectional side view of a portion of a typical injection molding system incorporating an infiltrated manifold heater plate assembly in accordance with an alternate embodiment of the present invention.

In a third embodiment, the melt distribution manifold is heated externally, such as by a electrical heater plate adjacent the manifold, as described in U.S. pending application Ser. No. 09/327,40, filed Jun. 8, 1999, which is concurrently owned herewith and the contents of which are incorporated by reference. Referring to FIG. 7, in molding system M', a manifold 100 is mounted between cavity plate 20' an back plate 22' by a central locating ring 30', and a plurality of insulative spacers 32' are provided to facilitate maintenance of a temperature differential between melt distribution manifold 100 and mold 18'. An infiltrated heater plate 106 (preferably copper-infiltrated steel) according to the present invention is removably mounted between nozzles 10' and melt distribution manifold 100 by screws 108 extending through heater plate 106, through holes 106a, and into manifold 100. A plurality of locating pins 110 extend from heater plate 106 into melt distribution manifold 100. Disposed within heater plate 106 is an electrical heating element 36'. Nozzle 10' is secured to heater plate 106 and melt distribution manifold 28' by bolts (not shown) extending through the melt distribution manifold 28' and heater plate 106.

Figure 8:
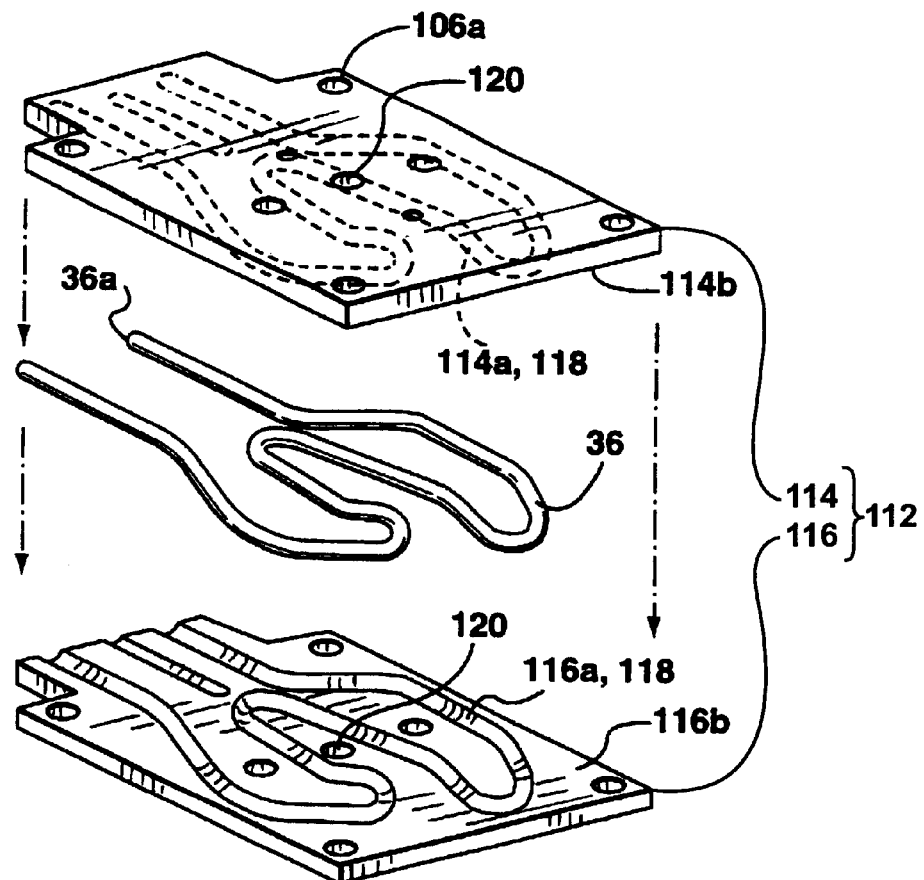
FIG. 8 is an exploded isometric view of the heater plate assembly of FIG. 7.
Figure 9:
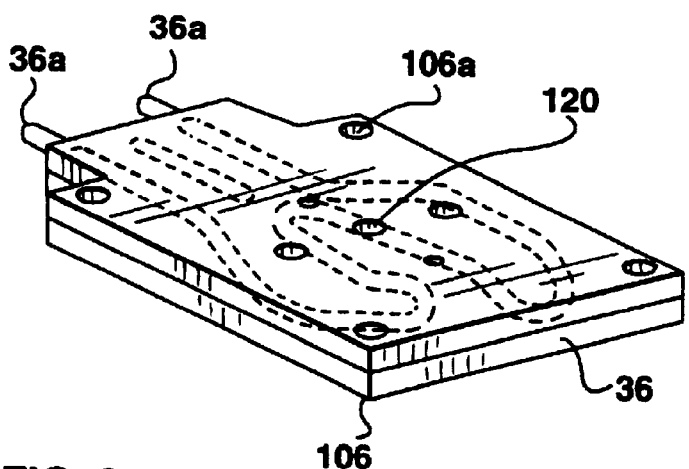
FIG. 9 is an isometric view of the assembled heater plate assembly of FIG. 7.

Referring to FIGS. 8 and 9, heater plate 106 comprises a planar body 112 having a front plate 114, having a groove 114a in an inner face 114b, and a rear plate 116, having a groove 116a in an inner face 116b. Heating element 36' is positioned intermediate plates 114 and 116, in a channel 118 formed by grooves 114a and 116a. A central bore 120 is provided in plates 114 and 116 to permit the passage of pressurized melt from manifold 100 to nozzle 10'. In other embodiments, the heater plate 106 can have a plurality of melt boxes 120 extending therethrough to permit heater plate 106 to be mounted adjacent a plurality of nozzles 10'. Heating element 36' has terminal portions 36a extendably positioned from heater plate 106 for connection to the leads (not shown) of a controlled power supply (also not shown). The configuration of channel 118 in heater plate 106 is designed to provide and maintain the desired temperature distribution across heater plate 106, and therefore also manifold 100 by conduction from plate 106, for a given application. Although channel 118 is comprised of cooperating grooves 114a and 116a in plates 114 and 116, it will be understood by one skilled in the art that such cooperation is not essential and that the channel 118 can equally be provided entirely within plate 114 or 116, as desired.

Heating element 36' is preferably brazed into channel 118 and plates 114 and 116 are preferably brazed together at faces 114b to 116b. Such brazing may be performed according to the prior art, i.e. as separate and distinct operations after the infiltration of plates 114 and 116 has been completed, however, according to an aspect of the present invention such brazing is preferably achieved simultaneously with the infiltration of plates 114 and 116, as will be described more fully below. Alternately to brazing, plates 114 and 116 may be joined, and element 36' bonded therein and thereto, using any other mechanical or metallurgical means known in the art as suitable, such as friction fit or thermal spraying, etc.

It will be understood by one skilled in the art that the heater plate may be positioned elsewhere in relation to the manifold, such as the position shown in the FIG. 17 embodiment described below.

Figure 10:
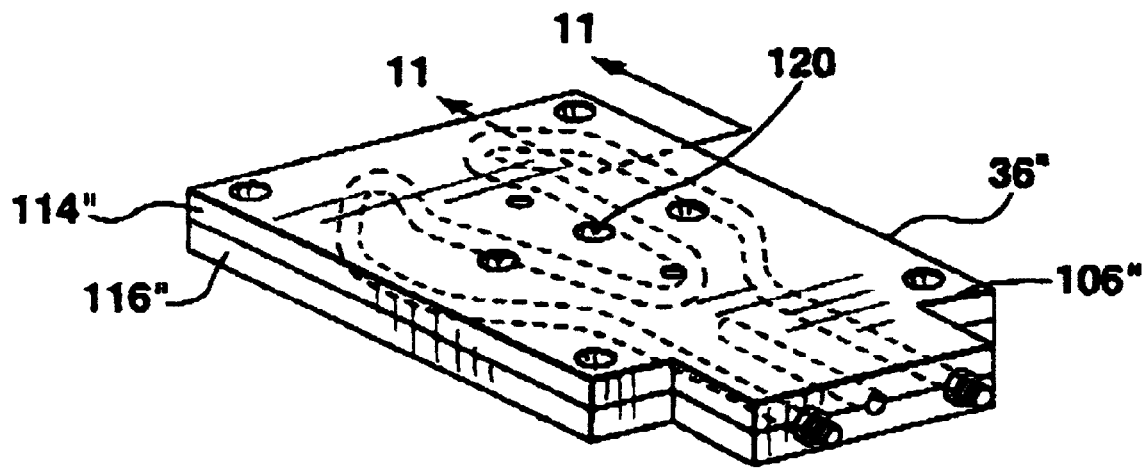
FIG. 10 is an isometric view of an alternate embodiment of the heater plate assembly of FIG. 7.
Figure 11:
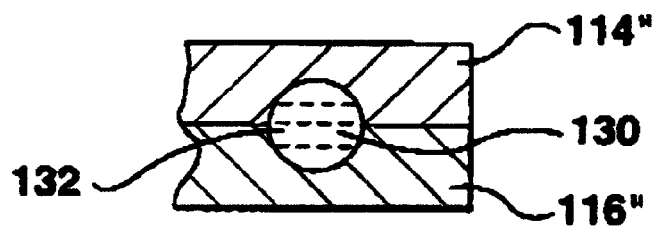
FIG. 11 is a sectional view along the line 11—11 in FIG. 10.

Referring to FIGS. 10 and 11, it will be understood that other means of heating the manifold and heater plate are available. The heater elements 36 and 36' can be replaced by a heating passage 130 through which a heated fluid 132, such as oil, is circulated. In another embodiment (not shown), the heating element can be one or more conventional cartridge type resistance heaters or heat pipes extending into one or more bores in manifold 28 or heater plate 106, such as is described in U.S. Pat. No. 4,500,279 to Devellian, incorporated herein by reference.

In a yet further embodiment, nozzle 10, rather than having integral heating element 54, has an external band heater, of the types disclosed in U.S. Pat. Nos. 5,411,392 to Von Buren and 5,360,333 to Schmidt, both of which are incorporated herein by reference. The construction of such band heaters will only briefly be described herein, though one skilled in the art will understand that the '392 and '333 patents fully describe the construction and operation of such heaters.

Figure 12:
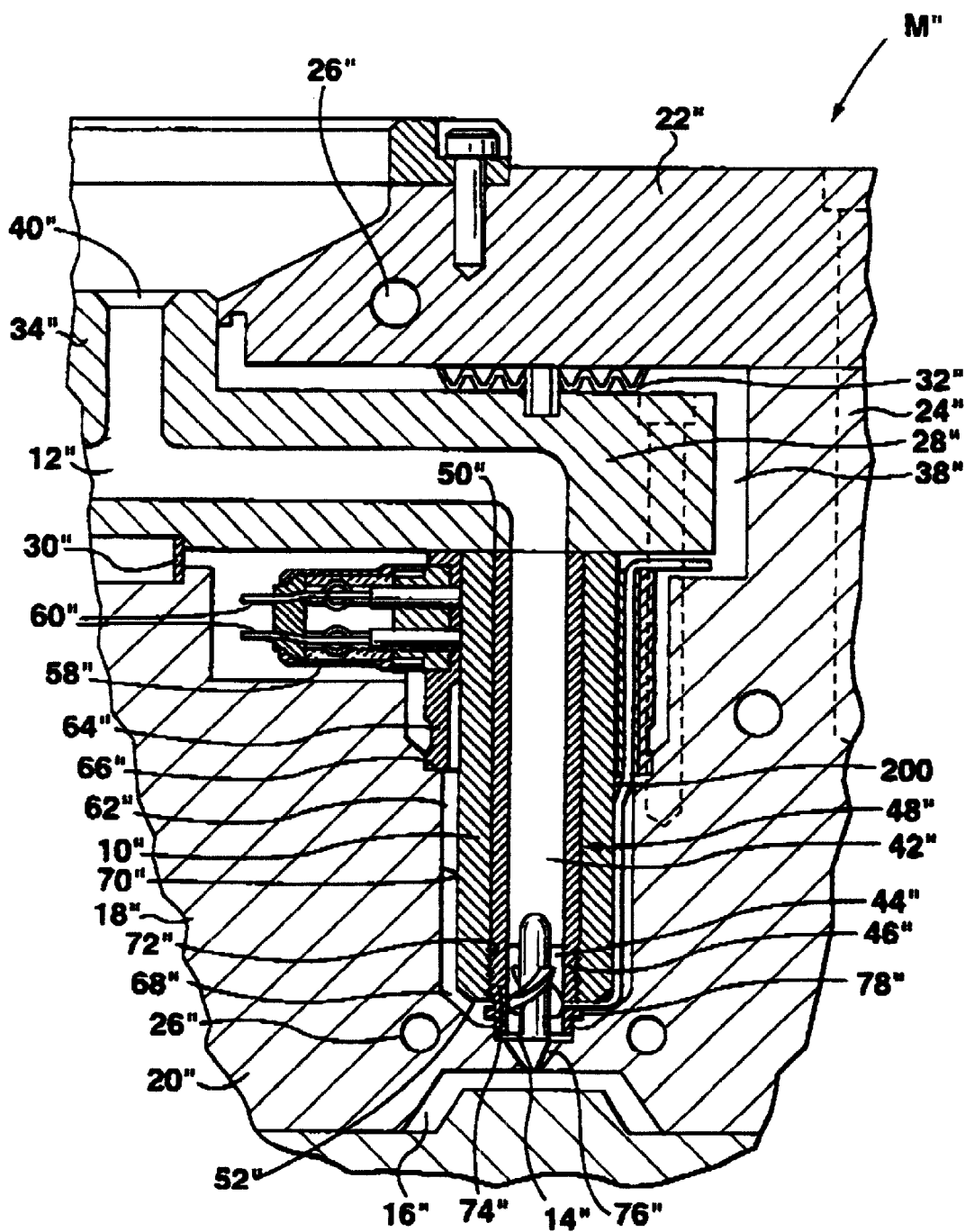
FIG. 12 is a sectional side view of a typical injection molding system incorporating an infiltrated nozzle band heater assembly in accordance with an alternate embodiment of the present invention.

Referring to FIG. 12, molding system M" is substantially identical to molding system M, except as will now be described. Nozzle 10" comprises a simple injection molding nozzle having a smooth outer surface 48". A band heater 200 is positioned snugly around nozzle 10". In operation, band heater 200 is connected to electrical leads 60" and provides heat by conduction to nozzle 10".

In one aspect of the embodiment of FIG. 12, band heater 200 may comprise a heater of the type disclosed in U.S. Pat. No. 5,411,392. Referring to FIG. 13, in this aspect heater 200 comprises an annular heater 202 and an annular spring 204. Spring 204 is formed to be spring-like and to exert continuous pressure on heater 202 to urge heater 202 towards nozzle 10". Spring 204 is preferably formed into a diameter smaller than heater 202 so as to exert continuous tension therearound and to apply a preload to heater 202 for a secure assembly. Spring 204 preferably exerts continuous pressure and contact on heater 202 along the heaters entire length, however other configurations may be preferable for a given molding application. Ends 206 and 208 of spring 204 are spaced from each other to leave a gap 210 therebetween which permits leads 60" from heater 202 to exit, however, other configurations may be used, and spring 204 may completely surround heater 202 and overlap itself. Either or both of heater 202 and spring 204 can be comprised of a two-phase infiltrated metal, as shown in FIG. 6 and described in further detail below, to enhance the strength and thermal conductivity of heater 200.

In a second aspect of this embodiment, band heater 200 may comprise a bimetallic clamping system of the type described in U.S. Pat. No. 5,360,333. Such a system provides a construction which holds heater 200 firmly on and around nozzle 10" without the need for additional clamping means. Referring to FIG. 14, heater 200 is bimetallic, formed by a cylindrical body or heater sheath 220 comprising a coaxial tube assembly with a cylindrical inner sleeve 222, a cylindrical outer sleeve 224 and a heater coil 226 positioned therebetween. Heater coil is electrically connected to leads 60" (not shown). As described in the '333 patent, inner sleeve 222 is formed from a material having a higher thermal expansion than outer sleeve 224. As will be understood by one skilled in the art, one or both of sleeves 222 and 224 can be fabricated of a two-phase infiltrated metal according to the present invention, and thus achieve the benefits disclosed herein, with the only stipulation being that inner sleeve 222 have an overall resulting thermal conductivity which is higher than that of outer sleeve 224.

Figure 17:
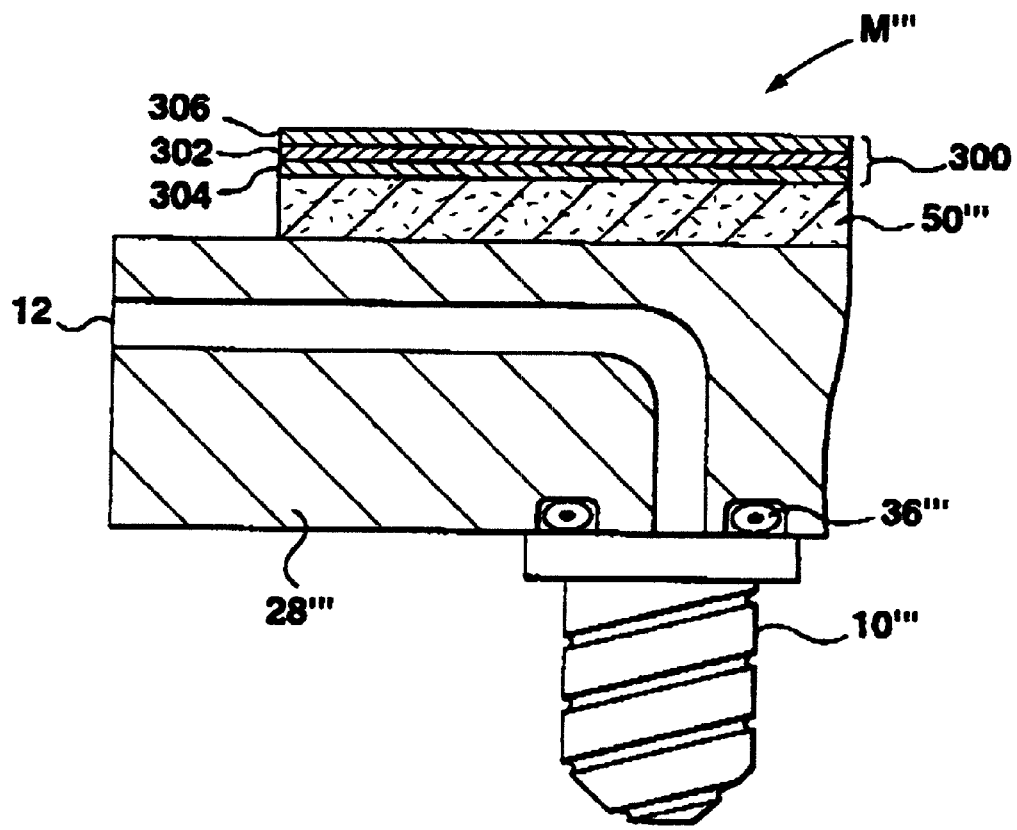
FIG. 17 is a sectional side view of a portion of a typical injection molding system incorporating a film heater element and infiltrated components in accordance with the present invention.
Figure 18:
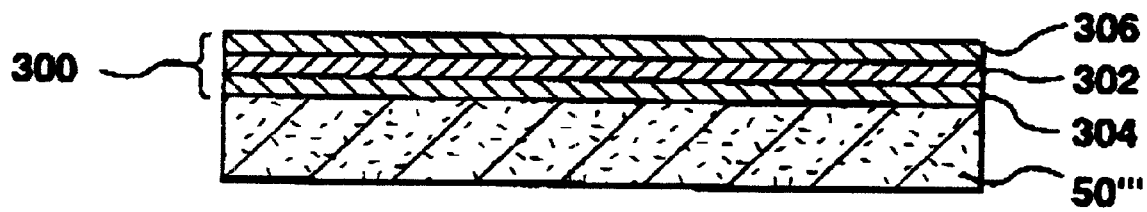
FIG. 18 is an enlarged partial view of the film heater plate of the embodiment of FIG. 17.
Figure 19:
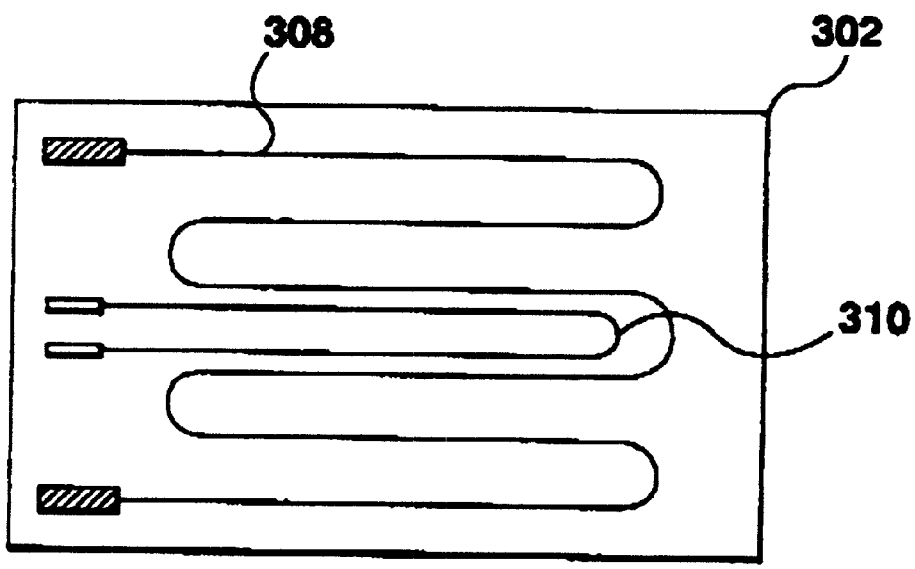
FIG. 19 is a plan view of the film heater of FIG. 17.

Referring to FIGS. 17–19, in a further embodiment of the current invention, a film heater element is used to heat a manifold heater plate. Film heaters are known and have been used in many applications outside the injection molding process. Film heaters have been recently introduced in conjunction with hot runner injection nozzles and hot runner manifolds. Reference is made in this regard to European Patent Application No. EP 0963829 to Husky Injection Molding Systems Ltd. and U.S. Pat. No. 5,973,296 to Juliano et al., both incorporated herein by reference. FIG. 17 shows a portion of a molding system M''' having an infiltrated manifold 28''' heated on one side by an element 36''' and heated on the other side by an infiltrated manifold heater 50'''. A melt channel 12''' though manifold 28''' carries pressurized melt from the molding machine to an infiltrated nozzle 10'''. Referring to FIG. 18, manifold heater 50''' has a heater unit 300 attached thereto, the heater unit 300 comprising a film heater element 302 disposed between a dielectric layer 304 (which can also be a film layer) and an insulation layer 306. Referring to FIG. 19, film heater element 302 is sheetlike having a heater element 308 and thermocouple element 310 therein. When activated, heater unit 300 provides heat to heater plate 50''' which, in turn, heats manifold 28'''. The film heater shown in FIG. 18 and FIG. 19 can be manufactured using any known technology mentioned in EP 0963829 or U.S. Pat. No. 5,973,296, and the references cited in both patents. It will be understood by one skilled in the art that heater 50''' could equally be positioned between manifold 28''' and nozzle 10''', in a similar manner as shown in the embodiment of FIG. 7, so as to perhaps remove the need for element 36'''.

Figure 20:
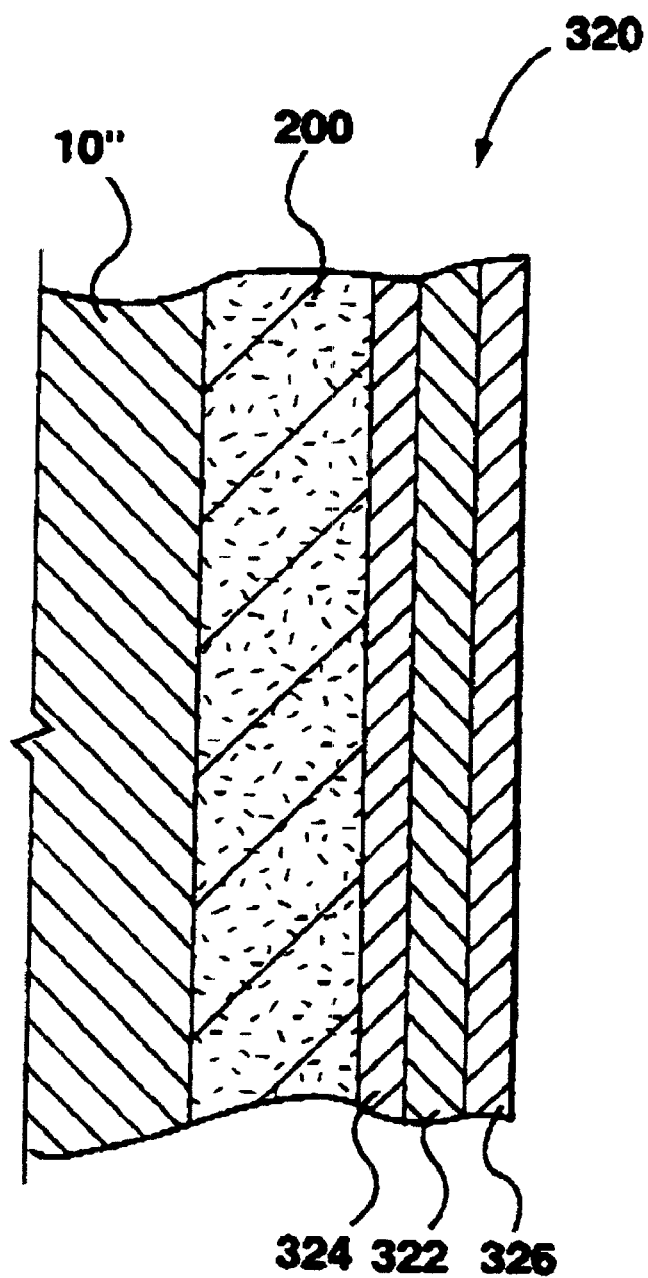
FIG. 20 is an enlarged sectional view of the band heater of FIG. 12 employing a film heater element.

Film heater technology can equally be used to provide an infiltrated band nozzle heater of the present invention (i.e. of the type depicted in FIG. 12). Referring to FIG. 20, a film heater 320 is provided which comprises a film heater layer 322 between a dielectric layer 324 and an insulation layer 326, as described in U.S. Pat. No. 5,973,296, and incorporated by reference. This heater provides heat to the infiltrated band heater 50'''.

Depending on a particular application, it may be desirable to employ a manifold, manifold heater plate and nozzle system in which some components are infiltrated and others are not. It is to be understood that the present invention includes all embodiments wherein at least one of said components is infiltrated.

In use, injection molding system M is assembled as shown in FIG. 1. While only a single cavity 16 has been shown in FIG. 1 for ease of illustration, it will be appreciated that melt distribution manifold 28, depending on the application, typically may have many melt passage branches extending to numerous cavities 16. Electrical power is applied to heating element 36 in manifold 28, and to heating elements 54 in the nozzles 10, to heat them to a predetermined operating temperature. Heating elements 36 in manifold 28 can be connected in series or in parallel. Alternatively, each heating element 36 or one or more groups of the heating elements 36 can be connected to a separately controlled power source (not shown) to individually adjust its temperature. In order to maintain the whole melt passage 12 at a uniform temperature it may be necessary to provide more heat to some manifolds 28 than to others. For instance, less heat is usually required for a manifold 28 in the centre of the mold 18 than for those around the periphery. Pressurized melt from a molding machine (not shown) is then injected into melt passage 12 through common inlet 40 according to a predetermined cycle in a conventional manner. The pressurized melt flows through melt bore 42 of each nozzle 10, past torpedo 46 and through gate 14 to fill cavity 16. After cavities 16 are filled, injection pressure is held momentarily, to pack the part, and then released. After a predetermined cooling period, the mold is opened to eject the molded products. After ejection, the mold is closed and injection pressure is reapplied to refill cavities 16. This cycle is continuously repeated with a frequency dependent on the size and shape of cavities 16 and the type of material being molded.

As will be apparent to one skilled in the art, molding system M', as depicted in FIGS. 4 and 5, M", as depicted in FIG. 12, and M''' as depicted in FIG. 17, operate substantially as just described, with the obvious exceptions. In the case of system M', heating elements 36', when activated, provide heat to heater plate 106 which, in turn heats manifold 28'. In the case of system M", heater 200 heats nozzle 10".

Due to the improved thermal conductivity characteristics of the infiltrated components according to the present invention, heat transferred from the heating element is more quickly and efficiently distributed through the infiltrated component by reason of the interconnected network of second phase metal 92 infiltrating the skeleton parent metal 90.

Thus, according to the present invention, by providing an injection molding component, such as manifold 28, heater plate 106, nozzle 10" or band heater 200, comprising a high-strength parent metal infiltrated by a second phase metal having high thermal conductivity, an injection molding component is achieved having high hardness, for withstanding high operation pressures and numerous operation cycles, and good thermal conductivity to effectively transfer heat throughout the structure. The result is improved temperature control of the pressurized melt within the manifold runner system, which can thereby beneficially affect cycle time, part quality and system efficiency.

According to the method of the present invention, manifold 28, front plate 114, rear plate 116, film heater plate 50''', nozzle 10" and/or band heater 200 can be formed using metal infiltration techniques to yield a two phase metal part having high hardness and enhanced thermal properties. The following description relates to the practice of the method to form plates 114 and 116, but it will be understood that such description applies equally to the fabrication of manifold 28, heater 50''', nozzle 10' and band heater 200, which contain modifications which will be evident to one skilled in the art.

A parent metal, typically a tool steel such as H13, is mixed in powder form with a plastic binder and prepared for metal injection molding into a preform having the near-net shape of a heater plate 114 or 116. It will be understood by one skilled in the art that the powder loading in the metal+binder admixture will be such that the green part will have shape retention when the part is debinderized. The admixture is then injection molded, using techniques well-known in the art, to yield a green part having a desired net or near-net shape.

The green part is next heated in a vacuum or inert gas environment to a temperature below the melting point of the parent metal but above the melting point of the binder, to debinderize the preform and leave a green preform comprising a skeleton having interconnected open porosity. The porous preform is then partially sintered to decrease the porosity of the part, and create a sintered porous preform. As will be understood by the skilled artisan, an increase in sintering temperature correspondingly decrease the amount of porosity in the preform. Thus, as preservation of the interconnected porosity throughout the sintered preform is desired, the sintering temperature should not exceed the temperature at which pore closure is initiated. Preferably, the sintered preform will have a porosity of between 40% to 10% volume and, more preferably between 30% and 15%.

Figure 15:
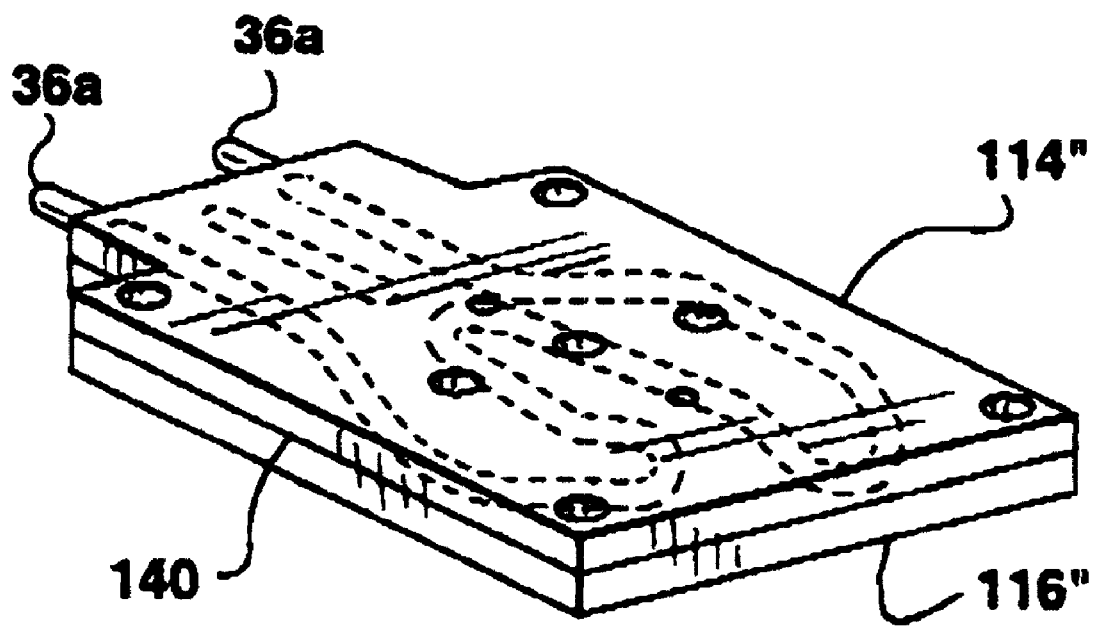
FIG. 15 is an isometric view of the green preform assembly of the heater plate of FIG. 7.

Referring to FIG. 15, the porous preforms 114" and 116" of a front heater plate 114 and a rear heater plate 116, respectively, are then aligned and positioned with mating inner surfaces 114b and 116b adjacent one another, and with electrical heater element 36' positioned in channel 118 therebetween, to form a preform assembly 140. Terminals 36a of element 36 are left suitably e)posed from preforms 114" and 116" for ultimate connection to a controlled power supply (not shown). The preform assembly 140 is then subjected to an infiltration of a second phase metal to substantially fill the porosity of the parent metal of heater plate preforms 114' and 116', as will now be described. A mass (not sown) of a thermally conductive metal, such as plate, sheet or ingot, is placed in contact with preforms 114" or 116", or both, of preform assembly 140 and then placed in a vacuum or inert gas furnace and heated to an infiltration temperature. The infiltrant mass need not contact both preforms 114" and 116", but need only contact one. In a particular application, however, a plurality on infiltrant masses may be desirable. The infiltration temperature of the furnace need only be slightly higher than the melting temperature of the metal infiltrant, and the infiltration temperature and time should generally be kept as low as possible to minimize any interaction or solubility between the parent metal and the infiltrant metal. At the infiltration temperature, the metal infiltrant melts over time and is absorbed by capillary action into the porous preform to fill the void spaces of the interconnected porosity therein. As will be apparent to one skilled in the art, sufficient infiltrant metal should be provided to substantially fill the interconnected porosity of the parent metal preform.

Advantageously, it has been found that as the second phase metal infiltrates into the interconnected porosity of the parent metal preform, the infiltrant also acts to braze faces 114b and 116b together. The infiltrant also simultaneously brazes electrical heating element 36' to channel 82. Thus, simultaneously with infiltration, an integral and metallurgically-bonded heater assembly 106 is achieved, thereby yielding good strength and thermal characteristics. Preferably, electrical heater element 36' is not infiltrated and the infiltration process does not other affect the functionality of heater element 36.

Once infiltration is complete, the thermally conductive metal infiltrant fills the former interconnected porosity of the parent metal (see FIG. 6) As a result, the manifold 28 and/or heater plate 106 has high hardness, for withstanding high operation pressures and numerous operation cycles, and good thermal conductivity to effectively transfer heat throughout the structure. The present invention also causes the thermally conductive metal infiltrant to set around electrical heating element 36', thereby integrating the element into heater plate 106 and thereby increasing the heat transfer efficiency of heater plate 106. The simultaneous nature of such brazing step beneficially reduces the number of steps required in tooling the molding system.

The present invention may be used advantageously with any parent metal having good strength characteristics, such as tool steels such as H13, M2, D2 or carbide steels. Regardless of parent metal chosen, the sintering conditions are used to control the amount of porosity in the green part, as one skilled in the art understands that overall porosity decreases with increased sintering temperature and/or time. Since the parent metal green preform must have connected open porosity, sintering must be carefully controlled to ensure that pore closure is avoided and the green part is permeable to the liquid metal infiltrant.

Any suitable metal infiltrant having high thermal conductivity may be successfully employed with the present invention. Copper and alloys of copper are most preferred, however.

It will be understood that binders suitable for use with the process of the present invention are those which melt or soften at low temperatures, such that the metal/binder admixture exhibits good flow properties during injection molding. However, the binder must also provide the green molded article with enough strength to prevent collapsing or deformation during handling. Preferably, the plastic binder chosen will degrade at a relatively low temperature to facilitate debinderization of the green part.

It will be apparent to one skilled in the art that the preform processing according to the present invention can be achieved through any powder processing method, and need not be limited to metal injection molding of the parent metal preform. For example, conventional powder pressing may be utilized, wherein the parent metal powder is first mixed with a lubricant, as is known in the art, and then pressed into the preform shape. The green preform is then delubed, and the porous preform is then sintered as described above. Alternatively, three-dimensional printing or other powder forming techniques as are known in the art may be employed. The present invention is not limited to a particular method of forming the parent metal preform and any method which yields a preform having interconnected open porosity may be employed.

The method of the present invention may be used to infiltrate and bond similar parent metals, for example such as in the joining of a heater plate 114 to a heater plate 116 as described above, or dissimilar metals, for example such as in the case of joining a heater element 36 to a heater plate 114 or 116, as described above, or both, as in the joining of heater plates 114 and 116 to heater element 36 as described above. The method may also be employed to create infiltrated injection nozzles, having integral heater elements simultaneously brazed therein during infiltration of the nozzle preform, as mentioned above. Similarly, other integrally heated components such as sprue bushings and the like may also be made according to the present method. Thus, the present invention may be employed with any number of porous preforms and any number of non-porous parts to be integrated therewith during infiltration.

Figure 16:
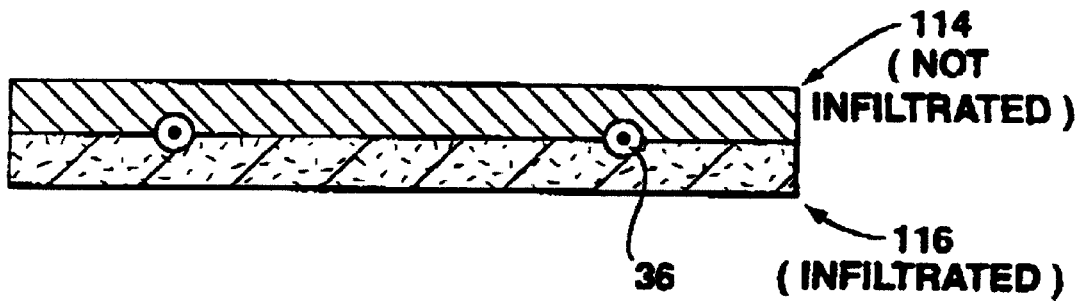
FIG. 16 is a sectional side view of a manifold heater wherein one plate is infiltrated and one plate is uninfiltrated.

Further, it will be understood by one skilled in that art that certain benefits may be achieved, depending upon the particular application, by using the teachings herein to fabricate a heater plate 106 according to the present invention in which only one of plates 114 and 116 is infiltrated according to the present invention and the other is uninfiltrated (see FIG. 16, wherein plate 114 is uninfiltrated). Further, though advantageous, the simultaneous infiltration and brazing of plates 114 and 116 is not required to achieve benefit according to the present invention. It may also be desirable, in a particular application, to provide the FIG. 7 embodiment with an infiltrated melt distribution manifold 100, in addition to or in place of, an infiltrated manifold heater. It will also be understood that it is not necessary that the infiltration within a particular part be uniformly distributed throughout the part, but rather may be localized in a region of the part. Likewise, it will be understood that plates 114 and 116 need not be composed of the same parent metals nor be infiltrated with the same second phase metals.

The following example is offered to aid understanding of the present invention and is not to be construed as limiting the scope of the invention as defined in the attached claims.

EXAMPLE

A powder of H13 tool steel is mixed with a polymer binder. The admixture is then injection molded into a green part having the shape of front heater plate 114 The binder is thermally removed in a furnace, preferably at a temperature not exceeding 500° C., to yield a green preform having open and interconnected porosity. The green porous preform is then partially sintered in the range of 1150° C. to 1260° C. until a final porosity of the sintered part of between 40% to 10% by volume is achieved. Simultaneously or successively, an H13 porous preform for rear heater plate 116 is also created using this described technique.

The front and rear heater preforms are fitted with a heater element 36' in recesses 114a and 116a and the preforms are then mated to yield a green heater assembly 140. The green assembly is then placed in a vacuum or inert gas furnace. A copper sheet is then placed on top of the green heater assembly, and the furnace is heated to 1120° C., slightly above the melting point of copper. The infiltrated and brazed integral part is then cooled and final machining, if any, is performed.

Thus it will be apparent to one skilled in the art the present invention provides an improved melt distribution manifold having improved strength and thermal characteristics over the prior art. Also, the method of the present invention provides simultaneous means of infiltrating and brazing a heated manifold assembly with heating element therein While the above description constitutes the preferred embodiments, it will be appreciated that the present invention is susceptible to modification and change without paring from the fair meaning of the proper scope of the accompanying claims.

We claim:
1. A hot runner injection molding apparatus, comprising:
   (a) a melt conveying system having
      (i) a melt distribution manifold having at least one melt passage for transferring melt from a source of pressurized melt, and
      (ii) at least one injection nozzle having a nozzle melt passage therethrough, said nozzle melt passage in fluid communication with said at least one manifold melt passage;
   (b) at least one mold cavity adjacent said at least one injection nozzle, said mold cavity in fluid communication with said nozzle melt passage of said at least one injection nozzle,
   (c) wherein at least one of said melt distribution manifold and said injection nozzle comprises a body and a heating element capable of heating at least a portion of said body;
   wherein at least a portion of said body is made of a parent metal, said parent metal being at least partially infiltrated with a second metal having a different thermal conductivity than said parent metal.

2. A melt distribution manifold for an injection molding apparatus, the manifold having at least one melt passage for transferring melt from a source of pressurized melt to an injection nozzle, and comprising a body and a heating element capable of heating at least a portion of said body, wherein at least a portion of said body is made of a parent metal at least partially infiltrated with a second metal having a different thermal conductivity than said parent metal.

3. An injection nozzle for an injection molding apparatus, the injection nozzle having a melt bore therethrough and comprising a body and a heating element capable of heating at least a portion of said body, wherein at least a portion of said body is made of a parent metal at least partially infiltrated with a second metal having a different thermal conductivity than said parent metal.

\* \* \* \* \*